(12) United States Patent
Wen et al.

(10) Patent No.: US 10,897,281 B2
(45) Date of Patent: Jan. 19, 2021

(54) NFC WATCH

(71) Applicants: SHENZHEN KAIFA TECHNOLOGY CO., LTD., Guangdong (CN); TAPPY TECHNOLOGIES LIMITED, Hong Kong (CN)

(72) Inventors: Anan Wen, Guangdong (CN); Ka Wai Leung, Guangdong (CN)

(73) Assignee: Tappy Technologies Ltd, Hong Kong (HK)

(*) Notice: Subject to any disclaimer, the term of this patent is extended or adjusted under 35 U.S.C. 154(b) by 0 days.

(21) Appl. No.: 16/073,035

(22) PCT Filed: May 25, 2016

(86) PCT No.: PCT/CN2016/083225
§ 371 (c)(1),
(2) Date: Jul. 26, 2018

(87) PCT Pub. No.: WO2017/201679
PCT Pub. Date: Nov. 30, 2017

(65) Prior Publication Data
US 2019/0036561 A1    Jan. 31, 2019

(51) Int. Cl.
*H04B 1/38* (2015.01)
*H04B 5/00* (2006.01)
(Continued)

(52) U.S. Cl.
CPC .......... *H04B 1/385* (2013.01); *G04R 60/06* (2013.01); *G06F 1/163* (2013.01); *H01Q 1/22* (2013.01);
(Continued)

(58) Field of Classification Search
CPC ........... H04B 1/385; H04B 2001/3861; H01Q 1/242; G06F 1/163
See application file for complete search history.

(56) References Cited

U.S. PATENT DOCUMENTS

| 8,111,144 B2* | 2/2012 | Kirkup | G06F 1/1626 340/13.26 |
| 2006/0214866 A1* | 9/2006 | Araki | G04G 21/04 343/788 |

(Continued)

FOREIGN PATENT DOCUMENTS

| CN | 103873101 A | 6/2014 |
| CN | 203747019 U | 7/2014 |

(Continued)

OTHER PUBLICATIONS

KLO3 product brief (from Google search) (Year: 2004).*

*Primary Examiner* — Muthuswamy G Manoharan

(57) ABSTRACT

An NFC watch includes a metal shell, a support and an NFC antenna arranged at the top of the support, wherein the support is mounted at the bottom of the metal shell, and the NFC antenna is clamped between the metal shell and the support and exposed to the outside. The NFC watch further includes a PCB arranged in the support and electrically connected with the NFC antenna and a power supply arranged at the bottom of the support and used for supplying power to the PCB. The NFC watch is simple in structure and high in practicability.

8 Claims, 3 Drawing Sheets

(51) Int. Cl.
*H04Q 1/24* (2006.01)
*G06F 1/16* (2006.01)
*H01Q 1/27* (2006.01)
*H04Q 1/22* (2006.01)
*G04R 60/06* (2013.01)
*H04B 1/3827* (2015.01)
*H01Q 1/22* (2006.01)
*H01Q 1/24* (2006.01)

(52) U.S. Cl.
CPC ............ *H01Q 1/242* (2013.01); *H01Q 1/273* (2013.01); *H04B 1/38* (2013.01); *H04B 5/0031* (2013.01); *H04B 2001/3861* (2013.01)

(56) References Cited

U.S. PATENT DOCUMENTS

| | | | |
|---|---|---|---|
| 2014/0187157 A1 | 7/2014 | Liao | |
| 2014/0246503 A1* | 9/2014 | Hofer | G06K 19/07794 235/492 |
| 2017/0222692 A1* | 8/2017 | Huang | H04B 5/0081 |

FOREIGN PATENT DOCUMENTS

| CN | 204009393 U | 12/2014 |
|---|---|---|
| CN | 204086836 U | 1/2015 |
| CN | 204631934 U | 9/2015 |

* cited by examiner

NFC WATCH

BACKGROUND OF THE INVENTION

Technical Field

The invention relates to the field of wearable devices, in particular to an NFC watch.

Description of Related Art

Near field communication (NFC) is a short-distance high-frequency radio technology and can achieve operation within the distance of 20 cm at the frequency of 13.56 MHz. Automatic communication between various devices can be achieved easily, safely, and rapidly through NFC, and thus NFC is widely applied to the fields of access control, public transportation, mobile payment, communication between wearable devices, and the like.

More and more watches with an NFC payment function are emerging on the market, and a large number of NFC watches are made of metal, however, due to the effect of eddy currents between metal and antennas, the communication distance of the NFC watches is extremely short; in order to meet the EMV requirement, the size of the NFC watches needs to be increased, and consequentially, the attractiveness of the NFC watches is affected.

Meanwhile, under the condition that the size of the NFC watches is small, a small-sized power supply is generally adopted; however, the capacity of the small-sized power supply can be limited, and consequentially the operation time of the NFC watches is extremely short. In addition, the NFC watches need to sense signals from external card readers all the time, the NFC function of the NFC watches is in service all the time, consequentially, the electricity of the NFC watches can be consumed rapidly, and the operation time of the NFC watches is further shortened.

BRIEF SUMMARY OF THE INVENTION

For solving the problem that in the prior art, since the NFC watches are made of metal, the communication distance of the NFC watches is short and the operation time of the NFC watches is short, the invention provides an NFC watch which is made of metal, good in communication capacity, and long in operation time.

The technical scheme provided by the invention is as follows:

The invention provides an NFC watch, the NFC watch comprises a metal shell, a support, and an NFC antenna arranged at the top of the support, wherein the support is mounted at the bottom of the metal shell, and the NFC antenna is clamped between the metal shell and the support and exposed to the outside; the NFC watch further comprises a PCB arranged in the support and electrically connected with the NFC antenna, and a power supply arranged at the bottom of the support and used for supplying power to the PCB.

According to the NFC watch of the invention, the PCB comprises a first control circuit, a second control circuit, a first low-frequency antenna, an NFC chip, a processor and a third control circuit, wherein the power supply is electrically connected with the processor and electrically connected with the first low-frequency antenna through the first control circuit, the first low-frequency antenna is electrically connected with the processor through the first control circuit and the second control circuit, and the processor is electrically connected with the NFC chip through the third control circuit; the NFC antenna is electrically connected with the NFC chip;

a second low-frequency antenna matched with the first low-frequency antenna is arranged on a card reader matched with the NFC watch. When the distance between the first low-frequency antenna and the second low-frequency antenna is smaller than a preset distance, the first low-frequency antenna sends a first control signal to the processor through the first control circuit. Upon receiving the first control signal, the processor sends a second control signal to the third control circuit to start the NFC chip and also sends a third control signal to the second control circuit to cut off the discharge path of the first low-frequency antenna. After the NFC chip finishes working, the NFC chip sends a fourth control signal to the processor through the third control circuit, and the processor sends a fifth control signal to the second control circuit to resume the discharge path of the first low-frequency antenna according to the fourth control signal.

According to the NFC watch of the invention, the first low-frequency antenna is formed by winding a copper wire with the diameter of 0.15 mm.

According to the NFC watch of the invention, the metal shell comprises an upper metal shell body and a lower metal shell body which are buckled together in an openable mode; an accommodating space is defined by the support and the metal shell; the NFC watch further comprises a dial plate and a movement which are arranged in the accommodating space; the first low-frequency antenna is arranged between the dial plate and the PCB, and a ferrite part is attached to the periphery of the lower metal shell body.

According to the NFC watch of the invention, the NFC antenna is made of a ferrite material.

According to the NFC watch of the invention, the processor is a MKL03Z8VFG4 CPU.

According to the NFC watch of the invention, the NFC chip is provided with an antenna booster; the first end of the NFC antenna is connected with the first end of the NFC chip sequentially through a first resistor and a first resonant capacitor, and the second end of the NFC antenna is connected with the second end of the NFC chip sequentially through a second resistor and a second resonant capacitor: the first end of NFC antenna is sequentially connected with the first resistor, a third resonant capacitor, and then the second resistor, and finally connected to the second end of NFC antenna; the first end of NFC antenna is sequentially connected with the first resistor, a fourth resonant capacitor, and then the second resistor, and finally connected to the second end of NFC antenna (80).

According to the NFC watch of the invention, by adoption of the technical scheme that the NFC antenna is clamped between the metal shell and the support and exposed to the outside, interference to the NFC antenna is structurally reduced, and the radiation path of the antenna is optimized. Furthermore, when the distance between the first low-frequency antenna of the NFC watch and the second low-frequency antenna of the card reader is smaller than a preset distance, the first low-frequency antenna sends a first control signal to the processor through the first control circuit, the processor controls the NFC chip to start to work through the third control circuit and also cuts off the discharge path of the first low-frequency antenna through the second control circuit, in this way, the NEC function of the NFC watch is not in service at ordinary times and is put into service only when the distance between the NFC watch and the card reader is smaller than the preset distance, and electric energy wastage caused under the condition that the NFC function is in service all the time can be effectively reduced; furthermore, little electric energy is consumed by the first low-frequency antenna, and thus the operation time of the NFC watch can be effectively prolonged; in addition, when the NFC chip starts to work, the first low-frequency antenna stops working so that interference to NFC communication between the NFC watch and the card reader can be reduced, and the NFC communication quality of the NFC watch is ensured. The NFC watch of the invention is simple in structure and high in practicability.

BRIEF DESCRIPTION OF THE SEVERAL VIEWS OF THE DRAWINGS

A further description of the invention is given with accompanying drawings and embodiments as follows, in the drawings.

DETAILED DESCRIPTION OF THE INVENTION

For making the purpose, technical schemes, and advantages of the invention clearer, a further detailed description of the embodiments of the invention is given with the accompanying drawings as follows.

First Embodiment

Figure 1:
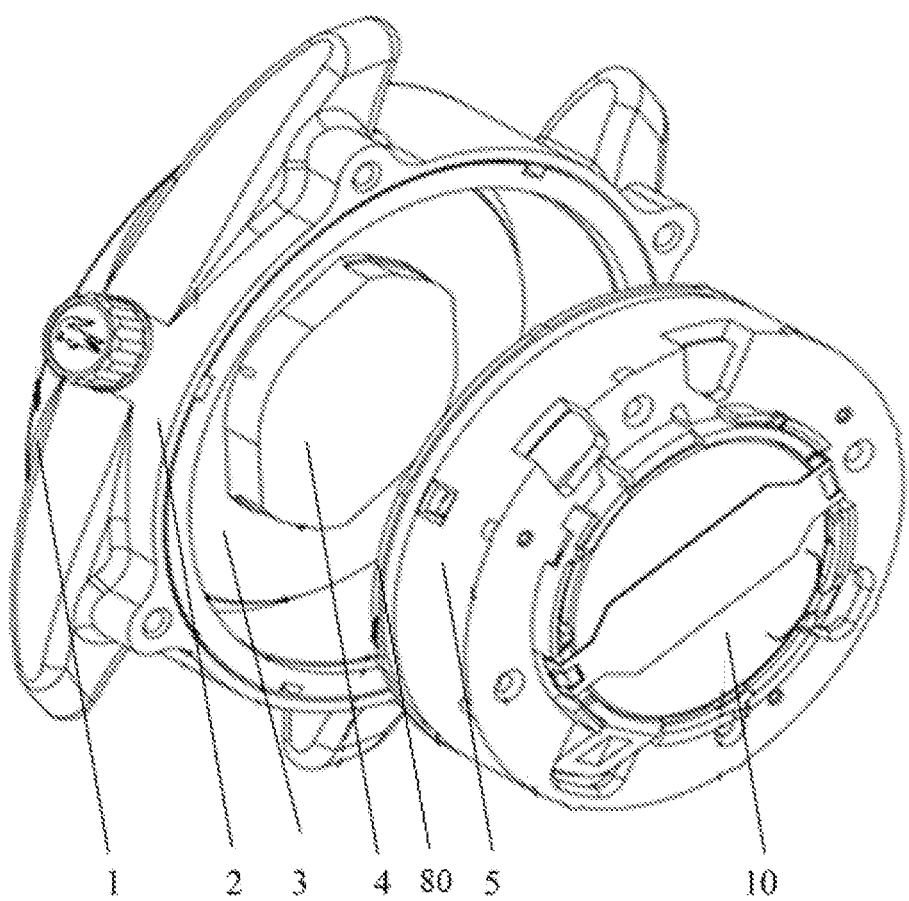
FIG. 1 is a structure diagram of an NFC watch in a first embodiment of the invention.
Figure 2:
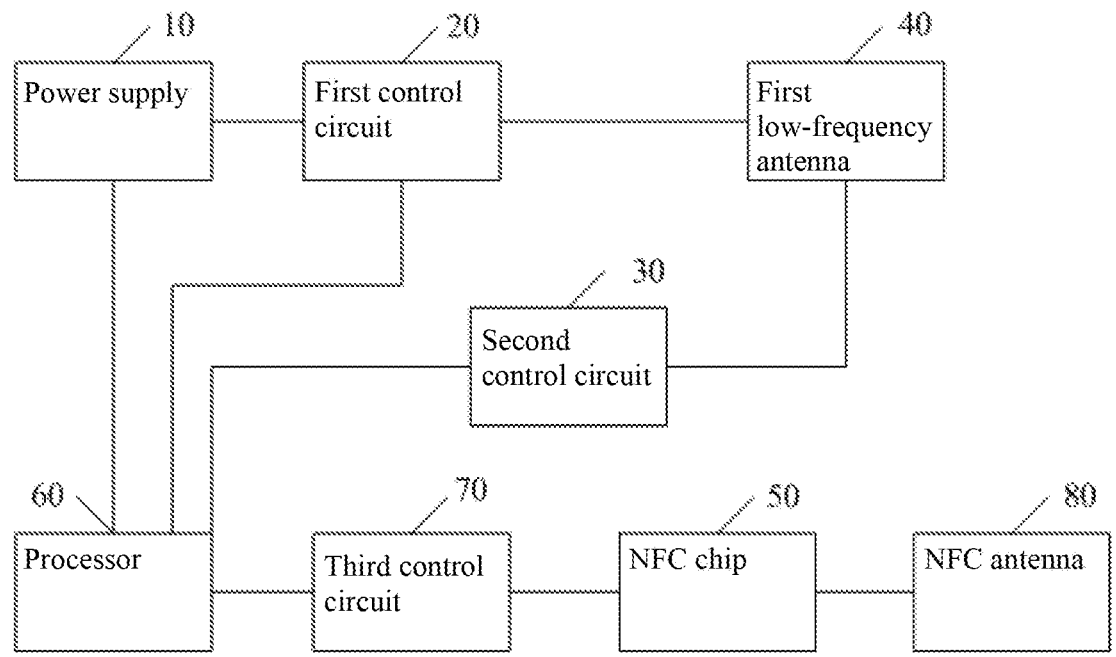
FIG. 2 is a diagram of functional modules of the NFC watch in the first embodiment of the invention.

Referring to FIG. 1 and FIG. 2, an NFC watch comprises a metal shell, a support (5) and an NFC antenna (80) arranged at the top of the support (5), wherein the support (5) is mounted at the bottom of the metal shell, and the NFC antenna (80) is clamped between the metal shell and the support (5) and exposed to the outside. The NFC watch further comprises a printed circuit board (PCB) (not shown in the FIGs) arranged in the support (5) and electrically connected with the NFC antenna (80) and a power supply (10) arranged at the bottom of the support (5) and used for supplying power to the PCB. In the technical scheme, since the NFC antenna (80) is clamped between the metal shell and the support (5) and exposed to the outside, the effect of eddy currents between the metal shell and the NFC antenna (80) is weakened. Meanwhile, the PCB and the power supply (10) are separated from the NFC antenna (80) through the support (5), so that interference to the NFC antenna (80) is structurally reduced, and the radiation path of the antenna is optimized.

Furthermore, as is shown in FIG. 1, the metal shell comprises an upper metal shell body (1) and a lower metal shell body (2) which are buckled together in an openable mode; an accommodating space is defined by the support (5) and the metal shell; the NFC watch further comprises a dial plate (3) and a movement (4) which are arranged in the accommodating space. A ferrite part is attached to the periphery of the lower metal shell body (2).

The power supply (10) can be a lithium battery and can also be a normal battery.

Furthermore, as is shown in FIG. 2, the PCB comprises a first control circuit (20), a second control circuit (30), the first low-frequency antenna (40), an NFC chip (50), a processor (60) and a third control circuit (70), wherein the power supply (10) is electrically connected with the processor (60) and electrically connected with the first low-frequency antenna (40) through the first control circuit (20), the first low-frequency antenna (40) is electrically connected with the processor (60) through the first control circuit (20) and the second control circuit (30), and the processor (60) is electrically connected with the NFC chip (50) through the third control circuit (70). The NFC antenna (80) is electrically connected with the NFC chip (50), the transmission power of the NFC chip (50) can be increased through the NFC antenna (80), and accordingly the wireless communication distance of the NFC watch is increased.

A second low-frequency antenna matched with the first low-frequency antenna (40) is arranged on a card reader matched with the NFC watch. When the distance between the first low-frequency antenna (40) and the second low-frequency antenna is smaller than a preset distance (the preset distance is generally not larger than the NFC communication distance of the NFC watch, for example, the preset distance is smaller than or equal to 20 cm), the first low-frequency antenna (40) sends a first control signal to the processor (60) through the first control circuit (20), and upon receiving the first control signal, the processor (60) sends a second control signal to the third control circuit (70) to start the NFC chip (50) and also sends a third control signal to the second control circuit (30) to cut off the discharge path of the first low-frequency antenna (40). After the NFC chip (50) finishes working, the NFC chip (50) sends a fourth control signal to the processor (60) through the third control circuit (70), and the processor (60) sends a fifth control signal to the second control circuit (30) to resume the discharge path of the first low-frequency antenna (40) according to the fourth control signal.

In the embodiment, the first low-frequency antenna (40) arranged on the NFC watch and the second low-frequency antenna arranged on the card reader are used in cooperation, for example, both the first low-frequency antenna (40) and the second low-frequency antenna are coils, when the first low-frequency antenna (40) and the second low-frequency antenna are coupled within a short distance, the first control circuit (20) can detect current changes of the first low-frequency antenna (40), the first control circuit (20) sends a first control signal to the processor (60) by judging that the current of the first low-frequency antenna (40) exceeds a preset threshold value; after the processor (60) receives the first control signal, on one hand, the processor (60) sends a second control signal to the third control circuit (70) to control the NFC chip (50) to start to work (in practical application, when the first low-frequency antenna (40) is in use, the first low-frequency antenna (40) can keep working as long as low current is supplied to the first low-frequency antenna (40), so that power consumption of the first low-frequency antenna (40) is much lower than power consumption of the NFC chip (50), and accordingly, the operation time of the NFC watch can be effectively prolonged); on the other hand, when the NFC chip (50) starts to work, the processor (60) can send a third control signal to the second control circuit (30) so as to cut off the discharge path of the first low-frequency antenna (40), namely the first low-frequency antenna (40) stops working, so that the influence of the first low-frequency antenna (40) on the NFC chip (50) can be reduced, accordingly, interference of the first low-frequency antenna (40) to NFC communication between the NFC watch and the card reader is reduced, and the NFC communication quality of the NFC watch is ensured.

Specifically, the first low-frequency antenna (40) can be formed by winding a copper wire with the diameter of 0.15 mm and is simple in structure and easy to manufacture, and accordingly the manufacturing cost of the NFC watch is reduced. The first low-frequency antenna (40) is arranged between the dial plate (3) and the PCB. The NFC antenna 80 is made of a ferrite material.

Selectively, the processor (60) can be an MKL03Z8VFG4 CPU. The MKL03Z8VFG4 CPU is adopted by the NFC chip (50) to control the power supply, power consumption of the MKL03Z8VFG4 CPU is extremely low, the lowest power consumption of the CPU can reach the nA level when the watch is not located in a card swiping area, the current of the CPU is only about (5) mA when the CPU is in work, in this way, power consumption of the NFC watch can be further reduced, and the operation time of the NFC watch is further prolonged.

Second Embodiment

The second embodiment is different from the first embodiment in that the NFC chip 50 is provided with an antenna booster.

Figure 3:
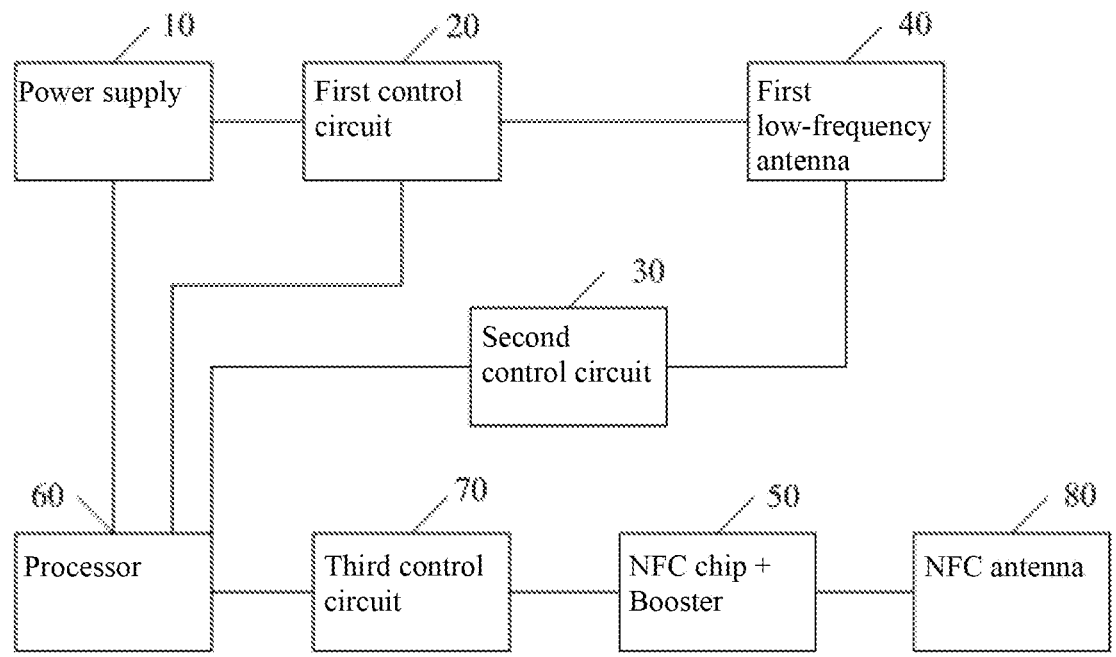
FIG. 3 is a diagram of functional modules of an NFC watch in a second embodiment of the invention.

As is shown in FIG. 3, the PCB comprises a first control circuit (20), a second control circuit (30), a first low-frequency antenna (40), the NFC chip (50) provided with the antenna booster, a processor (60) and a third control circuit (70), wherein the power supply (10) is electrically connected with the processor (60) and electrically connected with the first low-frequency antenna 40 through the first control circuit (20), the first low-frequency antenna (40) is electrically connected with the processor (60) through the first control circuit (20) and the second control circuit (30), and the processor (60) is electrically connected with the NFC chip (50) through the third control circuit (70). The NFC antenna (80) is electrically connected with the NFC chip (50), the transmission power of the NFC chip (50) can be increased through the NFC antenna (80), and accordingly the wireless communication distance of the NFC watch is increased.

A second low-frequency antenna matched with the first low-frequency antenna (40) is arranged on a card reader matched with the NFC watch. When the distance between the first low-frequency antenna (40) and the second low-frequency antenna is smaller than a preset distance (the preset distance is generally not larger than the NFC communication distance of the NFC watch, for example, the preset distance is smaller than or equal to 20 cm), the first low-frequency antenna (40) sends a first control signal to the processor (60) through the first control circuit (20). Upon receiving the first control signal, the processor (60) sends a second control signal to the third control circuit (70) to start the NFC chip (50) and also sends a third control signal to the second control circuit (30) to cut off the discharge path of the first low-frequency antenna (40). After the NFC chip (50) finishes working, the NFC chip (50) sends a fourth control signal to the processor (60) through the third control circuit (70), and the processor (60) sends a fifth control signal to the second control circuit (30) to resume the discharge path of the first low-frequency antenna (40) according to the fourth control signal.

In the embodiment, the first low-frequency antenna (40) arranged on the NFC watch and the second low-frequency antenna arranged on the card reader are used in cooperation, for example, both the first low-frequency antenna (40) and the second low-frequency antenna are coils, when the first low-frequency antenna (40) and the second low-frequency antenna are coupled within a short distance, the first control circuit (20) can detect current changes of the first low-frequency antenna (40), and the first control circuit (20) sends a first control signal to the processor (60) by judging that the current of the first low-frequency antenna (40) exceeds a preset threshold value; after the processor (60) receives the first control signal, on one hand, the processor (60) sends a second control signal to the third control circuit (70) to control the NFC chip (50) to start to work (in practical application, when the first low-frequency antenna (40) is in use, the first low-frequency antenna (40) can keep working as long as low current is supplied to the first low-frequency antenna (40), so that power consumption of the first low-frequency antenna (40) is much lower than power consumption of the NFC chip (50), and accordingly, the operation time of the NFC watch is effectively prolonged); on the other hand, when the NFC chip (50) starts to work, the processor (60) can send a third control signal to the second control circuit (30) so as to cut off the discharge path of the first low-frequency antenna (40), namely the first low-frequency antenna (40) stops working, so that the influence of the first low-frequency antenna (40) on the NFC chip (50) can be reduced, accordingly, interference of the first low-frequency antenna (40) to NFC communication between the NFC watch and the card reader is reduced, and the NFC communication quality of the NFC watch is ensured.

Specifically, the first low-frequency antenna (40) can be formed by winding a copper wire with the diameter of 0.15 mm and is simple in structure and easy to manufacture, and accordingly the manufacturing cost of the NFC watch is reduced. The first low-frequency antenna (40) is arranged between the dial plate (3) and the PCB. The NFC antenna (80) is made of a ferrite material.

Selectively, the processor (60) can be an MKL03Z8VFG4 CPU. The MKL03Z8VFG4 CPU is adopted by the NFC chips (50) to control the power supply, power consumption of the MKL03Z8VFG4 CPU is extremely low, the lowest power consumption of the CPU can reach the nA level when the watch is not located in a card sweeping area, the current of the CPU is only about 5 mA when the CPU is in work, in this way, power consumption of the NFC watch can be further reduced, and the operation time of the NFC watch is further prolonged.

Figure 4:
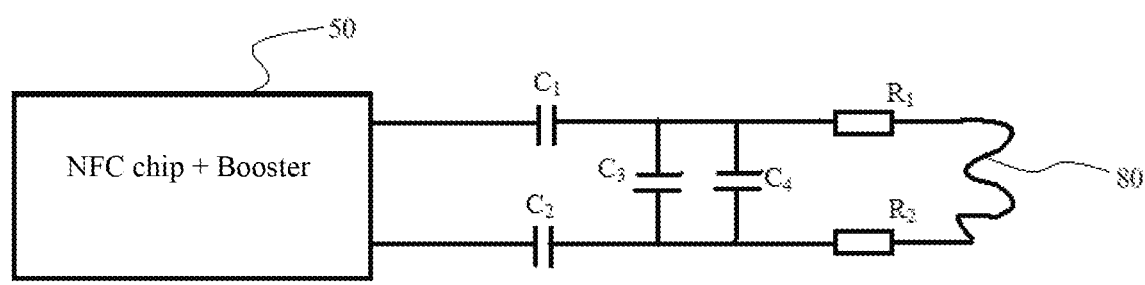
FIG. 4 is a circuit diagram of an antenna circuit of the NFC watch shown in FIG. 3.

As is shown in FIG. 4, the first end of the NFC antenna (80) is connected with the first end of the NFC chip (50) sequentially through a first resistor R1 and a first resonant capacitor C1, and the second end of the NFC antenna (80) is connected with the second end of the NFC chip (50) sequentially through a second resistor R2 and a second resonant capacitor C2; the first end of NFC antenna (80) is sequentially connected with the first resistor R1, a third resonant capacitor C3, and then the second resistor R2, and finally connected to the second end of NFC antenna (80); the first end of NFC antenna (80) is sequentially connected with the first resistor R1, a fourth resonant capacitor C4, and then the second resistor R2, and finally connected to the second end of NFC antenna (80); in the embodiment, the first resonant capacitor C1, the second resonant capacitor C2 and the NFC antenna (80) form a resonant circuit. The third resonant capacitor C3 and the fourth resonant capacitor C4 are used for assisting in resonance. The first resistor R1 and the second resistor R2 are used for regulating the Q factor (quality factor) of the resonant circuit.

According to the NFC watch of the invention, by adoption of the technical scheme that the NFC antenna is clamped between the metal shell and the support and exposed to the outside, interference to the NFC antenna is structurally reduced, and the radiation path of the antenna is optimized. Furthermore, when the distance between the first low-frequency antenna of the NFC watch and the second low-frequency antenna of the card reader is smaller than a preset distance, the first low-frequency antenna sends a first control signal to the processor through the first control circuit, the processor controls the NFC chip to start to work through the third control circuit and also cuts off the discharge path of the first low-frequency antenna through the second control circuit, in this way, the NFC function of the NFC watch is not in service at ordinary times and is put into service only when the distance between the NFC watch and the card reader is smaller than the preset distance, and electric energy wastage caused under the condition that the NFC function is in service all the time can be effectively reduced; furthermore, little electric energy is consumed by the first low-frequency antenna, and thus the operation time of the NFC watch can be effectively prolonged; in addition, when the NFC chip starts to work, the first low-frequency antenna stops working so that interference to NFC communication between the NFC watch and the card reader can be reduced, and the NFC communication quality of the NFC watch is ensured. The NFC watch of the invention is simple in structure and high in practicability.

The foregoing description only involves preferred embodiments of the invention and is not used for limiting the invention, and all modifications, equivalent substitutes and improvements which are made based on the spirit and principle of the invention should be within the protection scope of the invention.

What is claimed is:

1. A NFC watch with a deactivatable and activatable NFC functionality and/or a controllable NFC transmission power, comprising:
a metal shell, a support arranged in the metal shell and a switchable an NFC antenna is arranged at the top of the support disposed for controlling the NFC transmission power, wherein the support is mounted at the bottom of the metal shell, and the NFC antenna is clamped between the metal shell and the support and exposed to the outside of the support disposed for weakening eddy current effect between the metal shell and the NFC antenna; the NFC watch further comprises a PCB arranged in the support and electrically connected with the NFC antenna and functioned independently from the NFC antenna and having a NFC chip being switchable in response to a working state of the NFC watch and a power supply arranged at the bottom of the support and used for supplying power to the PCB;
wherein the NFC watch is configured to enable the NFC antenna to be switchable between an activated state and a deactivated state;
wherein when the NFC antenna is activated in the activated state, the power supply is, preferably configured to provide a first power, adapted for enabling activation and normal operation for NFC functionality of the PCB and the NFC antenna is configured to increase the NFC transmission power and wireless communication distance of the NFC watch, and reduce interference to NFC communication and ensure communication quality; and
when the NFC antenna is deactivated in the deactivated state, the power supply is, preferably configured to provide a second power being much lower than the first power and, adapted for enabling deactivation of NFC functionality and normal operation for non-NFC functionality of the PCB and the NFC antenna is configured to increase endurance of the NFC watch; and/or wherein the support is configured to enable the NFC antenna, the power supply and the PCB to be separated in the metal shell in such a manner that the NFC antenna and the power supply are arranged at opposite ends of the support and the PCB is arranged inside the support preferably to structurally reduce interference to the NFC antenna from the power supply and the PCB when NFC functionality of the PCB is activated, so as to optimize a radiation path of the NFC antenna.

2. The NFC watch according to claim 1, characterized in that wherein the PCB comprises a first control circuit, a second control circuit, a switchable first low-frequency antenna, a switchable an-NFC chip, a processor and a third control circuit, wherein the power supply is electrically connected with the processor and electrically connected with the first low-frequency antenna through the first control circuit, the first low-frequency antenna is electrically connected with the processor through the first control circuit and the second control circuit, and the processor is electrically connected with the NFC chip through the third control circuit; the NFC antenna is electrically connected with the NFC chip; wherein the first control circuit is configured to detect a current change of the first low-frequency antenna and send a corresponding control signal to the processor based on the current change, so as to switch the working state of the NFC watch or the activated and deactivated states of the NFC antenna; the second control circuit is configured to control correspondingly switching of the switchable first low-frequency antenna according to the control signal sent by the processor; and the third control circuit is configured to control correspondingly switching of the switchable NFC chip based on the control signal sent by the processor; and/or wherein the PCB is configured to detect a current change of the first low-frequency antenna and send a corresponding control signal to the processor based on the current change, and the processor is configured to switch alternately the first low-frequency antenna and the NFC chip according to the control signal and enable the NFC antenna to be switched between the activated and deactivated states a second low-frequency antenna matched with the first low-frequency antenna is arranged on a card reader matched with the NFC watch; when the distance between the first low-frequency antenna and the second low-frequency antenna is smaller than a preset distance, the first low-frequency antenna sends a first control signal to the processor through the first control circuit; upon receiving the first control signal, the processor sends a second control signal to the third control circuit to start the NFC chip and also sends a third control signal to the second control circuit to cut off the discharge path of the first low-frequency antenna on the other hand; after the NFC chip finishes working, the NFC chip sends a fourth control signal to the processor through the third control circuit, and the processor sends a fifth control signal to the second control circuit to resume the discharge path of the first low-frequency antenna according to the fourth control signal.

3. The NFC watch according to claim 2, characterized in that wherein the switchable first low-frequency antenna is formed by winding a copper wire with the diameter of 0.15 mm; and/or a power consumption of the switchable first low-frequency antenna is much lower than a power consumption of the switchable NFC chip.

4. The NFC watch according to claim 1, characterized in that wherein the metal shell comprises an upper metal shell body and a lower metal shell body which are buckled together in an openable mode; an accommodating space is defined by the support and the metal shell to accommodate the switchable NFC antenna sandwiched between the metal shell and the support and exposed at outside of the support, so as to weaken the effect of eddy currents between the metal shell and the NFC antenna; the NFC watch further comprises a dial plate and a movement which are arranged in the accommodating space; the first low-frequency antenna is arranged between the dial plate and the PCB, and a ferrite part is further attached to the periphery of the lower metal shell body.

5. The NFC watch according to claim 4, characterized in that wherein the switchable NFC antenna is made of a ferrite material.

6. The NFC watch according to claim 4, characterized in that wherein the processor is a MKL03Z8VFG4 CPU; and/or the processor is a CPU with an extremely low power consumption, wherein when the NFC antenna is activated, the power consumption of the CPU is at a first level; and when the NFC antenna is deactivated, the power consumption of the CPU is at a second level being million time lower than the first level, so as to reduce energy consumption of NFC watch and increase endurance of the NFC watch.

7. The NFC watch according to claim 2, characterized in that wherein the NFC chip is provided with an antenna booster; the first end of the NFC antenna is connected with the first end of the NFC chip sequentially through a first resistor (R1) and a first resonant capacitor (C1), the second end of the NFC antenna s connected with the second end of the NFC chip sequentially through a second resistor (R2) and a second resonant capacitor (C2); the first end of NFC antenna is sequentially connected with the first resistor (R1), a third resonant capacitor (C3), and then the second resistor (R2) and finally connected to the second end of NFC antenna; the first end of NFC antenna is sequentially connected with the first resistor (R1), a fourth resonant capacitor (C4), and then the second resistor (R2), and finally connected to the second end of NFC antenna; wherein the first resonant capacitor (C1), the second resonant capacitor (C2), and the NFC antenna are configured to form a resonant circuit, and the third resonant capacitor (C3) and the fourth resonant capacitor (C4) are configured to facilitate resonance, and the first resistor (R1) and the second resistor (R2) are configured for adjusting a quality factor of the resonant circuit, so as to help filtering out an interfering signal.

8. The NFC watch according to claim 2, wherein the first control circuit is configured to send a first control signal to the processor when detecting a current of the first low-frequency antenna exceeded a preset threshold, and the processor sends, based on the first control signal, a second control signal to the third control circuit to activate the NFC chip and on the other hand sends a third control signal to the second control circuit to cut off a discharge path of the first low-frequency antenna, so as to reduce influence to operation of the NFC chip and interference to NFC communication from the first low-frequency antenna and ensure communication quality; and when the NFC chip finishes a desired operation, the NFC chip sends a fourth control signal to the processor through the third control circuit, and the processor sends a fifth control signal to the second control circuit to resume the discharge path of the first low-frequency antenna according to the fourth control signal; and/or deactivate the NFC chip through the third control circuit so as to reduce a power wastage of the NFC watch and increase endurance of the NFC watch.

* * * * *